H. F. FRENCH.
ELECTRIC BATTERY.
APPLICATION FILED JULY 27, 1915.
1,289,433.
Patented Dec. 31, 1918.
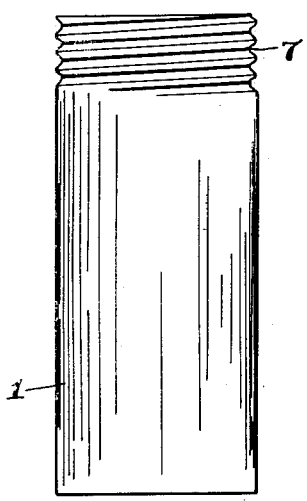
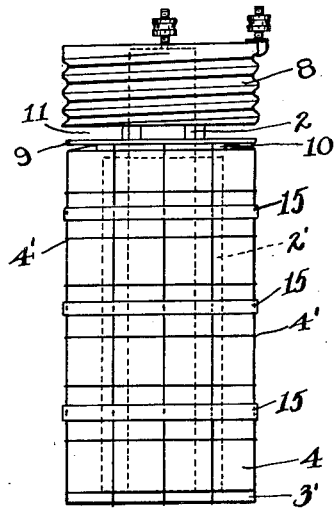
WITNESS
H G Grover
INVENTOR.
HARRY F. FRENCH
BY Ira J Adams,
ATTORNEY

UNITED STATES PATENT OFFICE.

HARRY F. FRENCH, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

REISSUED 1,289,433.

Specification of Letters Patent.   Patented Dec. 31, 1918.

Application filed July 27, 1915.   Serial No. 42,114.

*To all whom it may concern:*

Be it known that I, HARRY F. FRENCH, a citizen of the United States, residing at Fremont, in the county of Sandusky and State of Ohio, have invented a certain new and useful Improvement in Electric Batteries, of which the following is a full, clear, and exact description.

My invention relates to electric batteries and more particularly to those in which the re-acting elements are kept separated until the batteries are to be put into action. Various types of such batteries have heretofore been devised, but most of them require the user to add a specified quantity of water, or other liquid, before they can be made active. Still another proposed type requires the user to heat the battery container to remove an insulating coating applied to the zinc throughout its entire surface. In all these types the user is required to perform some operation that is more or less objectionable, and such batteries have therefore found a very restricted sale.

Such a battery can be commercially successful only to the degree to which it possesses simplicity of manipulation in being rendered active, promptness of electrical response to such treatment, and capability of producing service which compares favorably with that given by other cells of equal size and suitable for use for similar purposes. These advantages are best attained in a cell which requires no diffusion of liquid within the cell preceding readiness for action, no addition of materials whatsoever, and which can be readily made active without the use of any tools or other instruments.

It is the object of my invention to construct batteries that fulfil these requirements. Broadly speaking, my invention consists in retaining a liquid or pasty material in an inactive position and arranging the structure of the cell in such a way that this material can be forced around the electrode into active position by a simple manipulation of certain parts of the cell itself. The manner in which this result may be accomplished in regard to the so-called dry cell will now be described, reference also being had to the drawings in which:—

Figure 1 is a front view of the zinc container electrode.

Fig. 2 is a front view of the cartridge.

Fig. 3 is a central cross sectional view of the battery when in the inactive position.

Fig. 4 is a central cross sectional view of the battery when in the active position.

In most cells of the so-called "No. 6" size the battery mix is tamped into a zinc can having a bibulous lining of pulpboard or similar material. In the smaller size of cells, such as is used in flashlights, the mix containing the electrolyte is molded around the central carbon electrode in a hard, compact form, and a bag wrapped around it to prevent it from contacting with the zinc can when it is placed therein. In this smaller type the molded "cartridge," as it is called, loosely fits the can so that there is room for a pasty material to be poured around the same. This pasty material contains water, flour and certain chemicals depending somewhat upon the make of the cell.

In the improved type of cell herein disclosed, it is preferable to use the molded cartridge type, although the improvement is primarily intended for the No. 6 size or kind of battery.

Referring to the drawings, 1 represents a cylindrical zinc container which constitutes one electrode of the dry cell. The cartridge to be inserted in the container is clearly shown in Fig. 2 and the same consists of a central carbon electrode 2 which is preferably fluted to increase the conductivity and to assist in holding the electrode in the molded mix. To further assist in holding these parts together, certain of the ridges 2' of the electrode may be notched at 3, as shown in Figs. 3 and 4. The molded cartridge is wrapped in cloth 4, such as cheesecloth, and after adding cardboard disks 10 and 3' at the top and bottom the whole is bound securely by cords 4' as is customary in cells of such construction.

Instead of assembling this molded cartridge in a zinc can in the usual way, a pasty or liquid material 5 is first poured into the can 1 and the same effectively sealed by pouring on top of it a layer 6 of ceresin or other suitable material. This pasty material preferably consists of flour and water with some preservative such as zinc chlorid to prevent it from fermenting and evolving gas.

After having sealed off the paste in the bottom of the can, the cartridge is inserted therein and allowed to rest on top of the seal 6. The upper part of the can 1 having been previously threaded at 7, a short piece of zinc 8 similarly threaded to fit inside the can, is screwed partly into the open end thereof. A cardboard disk 9 is then fitted on top of the small disk 10 and on top of this are placed several spacing blocks 11 made preferably of wood, though other inactive material of course could be used. On top of the blocks 11 is then placed one or more cardboard disks 12 which should snugly fit into the threads of the inner zinc 8. After having closed the bottom of the zinc ferrule 8 in this way, the usual seal 9' of molten pitch, or asphaltum compound, is poured in on top to seal the cell to rigidly retain the carbon electrode therein. When this is done the ferrule 8 and attached cartridge may be screwed out slightly so there is no danger of pressure being prematurely applied on the seal 6 by accidental blows during shipment.

Although it is not imperative it is preferable to seal the zinc 8 where it emerges from the can 1, by applying thereto a bead of some soft wax 13, such as ceresin or paraffin, at the junction point of the two. The cell may then be inserted in the usual jacket 14. In this condition (shown in Fig. 3) the cell is inactive and may be stored indefinitely without substantial deterioration.

The active materials in the molded cartridge are prevented from attacking the zinc in the inoperative position, as there is but slight occasional contact and especially since there is not sufficient moisture in the cartridge to cause any considerable interaction. However, if it is desired to completely prevent any premature corrosion of the zinc can, rubber bands 15 may be placed around the cartridge at several places to effectually space the two apart.

When the user desires to put the cell in action it is only necessary to grasp the zinc ferrule 8, with its rigidly attached cartridge, and screw the latter down into the zinc can 1. As the cartridge is forced into the can, the seal 6 will give way around the edge and the liquid or pasty material 5 will be forced up around the cartridge to fill the space between it and the zinc container, and also more or less of the chamber between the disks 9 and 12. In case that the rubber bands 15 are used as spacers, there will still be sufficient clearance for the passage of the paste up around the cartridge.

After the cell has been put into its operative position, shown in Fig. 4, it acts in the same way as an ordinary dry cell. The paste or other liquid next to the zinc permits the electrolyte which is in the battery cartridge to diffuse to the zinc and cause electrolytic action in the usual way.

It will be apparent from the preceding description that my invention produces a practical cell that will keep indefinitely on "shelf" without deteriorating or in any way wasting its strength. The novel way of putting the cell into action is so simple that there will be no objection on the part of the user to performing this slight operation.

A preferable way to connect the container to the other parts of the battery is that previously described, on account of the threaded connection furnishing a more or less powerful means for forcing the paste up around the cartridge, but it will be apparent that there are many other equivalent ways of accomplishing the same purpose, specific mention of which need not be made.

The collar or ferrule 8 need not necessarily be attached to the cartridge while it is in the battery can, as part or all of this operation could obviously be carried out with the cartridge resting in a proper shaped form or dummy receptacle. Other variations in the procedure of making the cell are also permissible.

Having described my invention, what I claim is:—

1. In electric batteries, a container, a supply of material at one end of the container, an electrode suspended therein, a seal between said material and electrode, and means whereby the electrode can be moved farther into the container to force the material past said seal and up around the electrode.

2. In electric batteries, a tubular electrode, a supply of material at one end of the tubular electrode, a seal on top of said material, a second electrode suspended in said tubular electrode, and means whereby the second electrode can be moved against said seal to force said material up between the two electrodes.

3. In electric batteries, a container electrode, a supply of paste in the bottom of said container electrode, a carbon electrode having a cylinder of electrolyte mix secured thereto, and a metal ferrule around the upper end of the carbon electrode secured thereto by non-conducting material, said container electrode having means to engage the metal ferrule to suspend the electrode mix above the paste and out of contact therewith.

4. In electric batteries, a container electrode having screw threads on its open end, a supply of flour paste in the bottom of the container, a seal on top of said paste, a carbon electrode, a cylinder of electrolyte mix secured to the carbon electrode, and sealing material inside of the ferrule to secure the carbon electrode thereto, said ferrule being adapted to screw into the end of the container electrode.

In testimony whereof, I hereunto affix my signature.

HARRY F. FRENCH.